(12) United States Patent
Daun

(10) Patent No.: US 9,783,369 B1
(45) Date of Patent: Oct. 10, 2017

(54) ROW SWEEP SYSTEM FOR PALLETIZER

(71) Applicant: Arrowhead Systems, Inc., Oshkosh, WI (US)

(72) Inventor: Kenneth J. Daun, Waupun, WI (US)

(73) Assignee: Arrowhead Systems, Inc., Oshkosh, WI (US)

( * ) Notice: Subject to any disclaimer, the term of this patent is extended or adjusted under 35 U.S.C. 154(b) by 0 days.

(21) Appl. No.: 15/181,704

(22) Filed: Jun. 14, 2016

(51) Int. Cl.
*B65G 19/02* (2006.01)
*B65G 47/82* (2006.01)
*B65G 19/26* (2006.01)

(52) U.S. Cl.
CPC ........... *B65G 19/02* (2013.01); *B65G 19/265* (2013.01); *B65G 47/82* (2013.01)

(58) Field of Classification Search
CPC ...... B65G 19/24; B65G 19/245; B65G 19/26; B65G 19/02; B65G 19/265; B65G 47/82
See application file for complete search history.

(56) References Cited

U.S. PATENT DOCUMENTS

| | | | |
|---|---|---|---|
| 2,997,187 A | 8/1961 | Burt | |
| 3,194,382 A * | 7/1965 | Nigrelli | B65G 47/088 198/418.1 |
| 3,669,282 A | 6/1972 | Carlson | |
| 3,934,713 A | 1/1976 | Van der Meer et al. | |
| 4,026,422 A | 5/1977 | Leenaards | |
| 4,073,387 A | 2/1978 | Bowser | |
| 4,271,755 A | 6/1981 | Kintgen et al. | |
| 4,439,084 A | 3/1984 | Werkheiser | |
| 4,978,275 A * | 12/1990 | Reid | B65G 57/11 198/419.1 |
| RE35,066 E | 10/1995 | Martin | |
| 5,667,055 A * | 9/1997 | Gambetti | B65B 21/06 198/418.7 |
| 6,152,681 A | 11/2000 | Vincent et al. | |
| 6,164,900 A | 12/2000 | Labell et al. | |
| 6,843,360 B2 * | 1/2005 | Peterman | B65B 35/405 198/418.6 |
| 7,607,883 B2 | 10/2009 | Yagi | |
| 7,726,463 B2 * | 6/2010 | Aronsson | B65G 47/086 198/419.2 |
| 8,113,335 B2 * | 2/2012 | Aronsson | B65G 47/086 198/419.2 |
| 2003/0026682 A1 | 2/2003 | Heston et al. | |
| 2005/0133341 A1 * | 6/2005 | Chiu | B65B 11/10 198/419.1 |
| 2011/0067975 A1 * | 3/2011 | Pazdernik | B65G 47/088 198/429 |
| 2014/0154042 A1 | 6/2014 | Pierson et al. | |

* cited by examiner

*Primary Examiner* — Mark A Deuble
(74) *Attorney, Agent, or Firm* — Boyle Fredrickson, S.C.

(57) ABSTRACT

A row sweep system is configured to allow a sweep pusher arm such as a roller to travel around a station such as a row-forming station of a palletizer at a substantially constant velocity. The row sweep system may include a pair of semi-concentrically continuous drive members such as inner and outer drive chain loops that are connected through inner and outer pivot arrangements to the sweep pusher arm. The inner pivot arrangement may define a slide pivot that allows for varying an effective length of a driven arm defined between the inner and outer pivot arrangements to accommodate movement of the sweep pusher arm through a corner while maintaining a substantially constant velocity.

14 Claims, 6 Drawing Sheets

ROW SWEEP SYSTEM FOR PALLETIZER

BACKGROUND OF THE INVENTION

1. Field of the Invention

This invention relates generally to material handling systems. More particularly, the present invention is a row sweep system for a palletizer of a material-handling system.

2. Discussion of the Related Art

Palletizers of material-handling systems form groups of products and load the groups onto pallets. This may be done by way of, for example, bulk grouping or case grouping of products and transferring the groups onto pallets. Sweep systems are known for pushing groups of products from one station to another or onto a pallet or a pallet-loading device at the palletizer. Some sweep systems use reciprocating arms to push the products in one direction and then return to a home position in an opposite direction. These reciprocating systems take time to reciprocate back and forth, which can limit the speed at which product can be moved through the palletizer and can require complex controls to achieve the back-and-forth motion. Attempts have been made to use looping-type sweep arms that travel completely around stations of the palletizer so that the sweep arms can be driven in a single direction to return to the home position, which can simplify the controls and reduce the amount of time to return to the home positions. A looping-type sweep arm is typically driven from a single chain, with the sweep arm supported from a bracket(s) that is cantilevered from the chain to extend beyond the station and allow the rotation of the sweep arm around the station. However, even when these single chain-type drive systems are driven at a constant speed, the sweep arms tend to speed up through the corners in a manner that can cause extreme inertial forces and unwanted momentum as the sweep arms travel through the corners while rotating around the station. This is because, when rounding or traveling through a corner during equal time intervals, a sweep arm carried by a single chain-type drive system has to travel distances that increase per equal time interval while passing through an apex of the corner. This leads to the sweep arm experiencing a substantial acceleration spike while entering the corner and a substantial deceleration spike while exiting the corner, which can increase wear rate of system components and can cause unwanted whipping characteristics to the movement of the sweep arm.

SUMMARY OF THE INVENTION

The present invention is directed to a row sweep system that is configured to allow a sweep pusher arm such as a roller to travel around the station such as a row-forming station of a palletizer at a substantially constant velocity.

The row sweep system may include a pair of continuous drive members such as inner and outer drive chain loops that are arranged semi-concentrically with respect to each other, and a sweep arrangement that is driven by both the inner and outer drive chain loops at different locations relative to the sweep arrangement.

According to one aspect of the invention, a row sweep system is provided for a palletizer of a material-handling system. The palletizer may include a station across which product is moved for palletizing. The row sweep system may include a sweep arrangement that is configured to travel around the station for pushing product off from the station. A sweep drive system is configured to drive the sweep arrangement around the station. The sweep drive system may include a first continuous drive member that travels along a continuous path and defines a first drive loop. A second continuous drive member travels along a continuous path and defines a second drive loop that is arranged outwardly of the first drive loop. Each of the first and second continuous drive members is connected to the sweep arrangement so that a first segment of the sweep arrangement travels along a path corresponding to the first drive loop and a second segment of the sweep arrangement travels along a path corresponding to the second drive loop.

According to another aspect the invention, each of the first and second continuous drive members is a drive chain. The station may be a row-forming station and the sweep arrangement may be configured to push product from the row-forming station to a layer-forming station. The sweep arrangement may include a pair of sweep link arms with a sweep pusher arm extending between the pair of sweep link arms for pushing product off from the station. The pair of sweep link arms may be configured to drive the sweep pusher arm at a substantially constant velocity while traveling around the sweep station.

According to another aspect the invention, the first continuous drive member may be defined by an inner drive chain that defines an inner drive chain loop. The second drive member may be defined by an outer drive chain arranged outwardly of the inner drive chain and that defines an outer drive chain loop. The sweep arrangement may include a sweep arm assembly with a sweep link arm supported by each of the inner and outer drive chains by way of respective inner and outer pivot arrangements. The outer pivot arrangement may include a first pivot pin that is fixed relative to a length of the sweep link arm. The inner pivot arrangement may include a second pivot pin that is movable relative to the length of the sweep link arm. The sweep link arm may have an inner link arm segment with a slot that extends longitudinally through the inner link arm segment. The second pivot pin of the inner pivot arrangement may be arranged in the slot and configured to move along the length of the slot. The sweep arm assembly may include a sweep pusher arm supported by the sweep link arm with the pivot pin of the outer pivot arrangement arranged between the sweep pusher arm and the slot of the inner link arm segment.

According to another aspect of the invention, the sweep drive system includes an inner drive chain configured to rotate through a continuous path that defines an inner drive chain loop, and an outer drive chain configured to rotate through a continuous path that defines an outer drive chain loop arranged outwardly of the inner drive chain loop. A sweep arrangement is driven by the sweep drive system and configured to travel around the station for pushing product off from the station. The sweep arrangement may include a sweep pusher arm configured to push product off from the station. A sweep link arm connects the sweep pusher arm to the sweep drive system and includes an inner segment driven by the inner drive chain. An intermediate segment of the sweep link arm is driven by the outer drive chain. An outer segment of the sweep link arm extends beyond the station and supports the sweep pusher arm.

According to another aspect of the invention, an outer driving engagement location is defined at an engagement between the intermediate segment of the sweep link arm and the outer drive chain. An inner driving engagement location is defined at an engagement between the inner segment of the sweep link arm and the inner drive chain. The sweep link arm may include a working lever arm with a constant length defined between the sweep pusher arm and the outer driving engagement location. A driven lever arm with a variable length may be defined between the outer driving engagement location and the inner driving engagement location.

According to another aspect of the invention, the inner segment of the sweep link arm may include a slot and the pivot pin may be arranged in the slot to move along a length of the slot for attaching the inner segment of the sweep link arm to the inner drive chain and provide the variable length of the driven lever arm. While the sweep pusher arm travels around the station, an orientation of the sweep link arm may vary with respect to travel direction of the sweep link arm corresponding to movement of the pivot pin along the length of the slot of the inner segment of the sweep link arm for maintaining the substantially constant velocity of the sweep pusher arm while traveling around the station. A clearance distance is defined between the sweep pusher arm and the station while traveling along a path around the station. The clearance distance may have a minimum value when the sweep pusher arm travels through a corner of the path.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
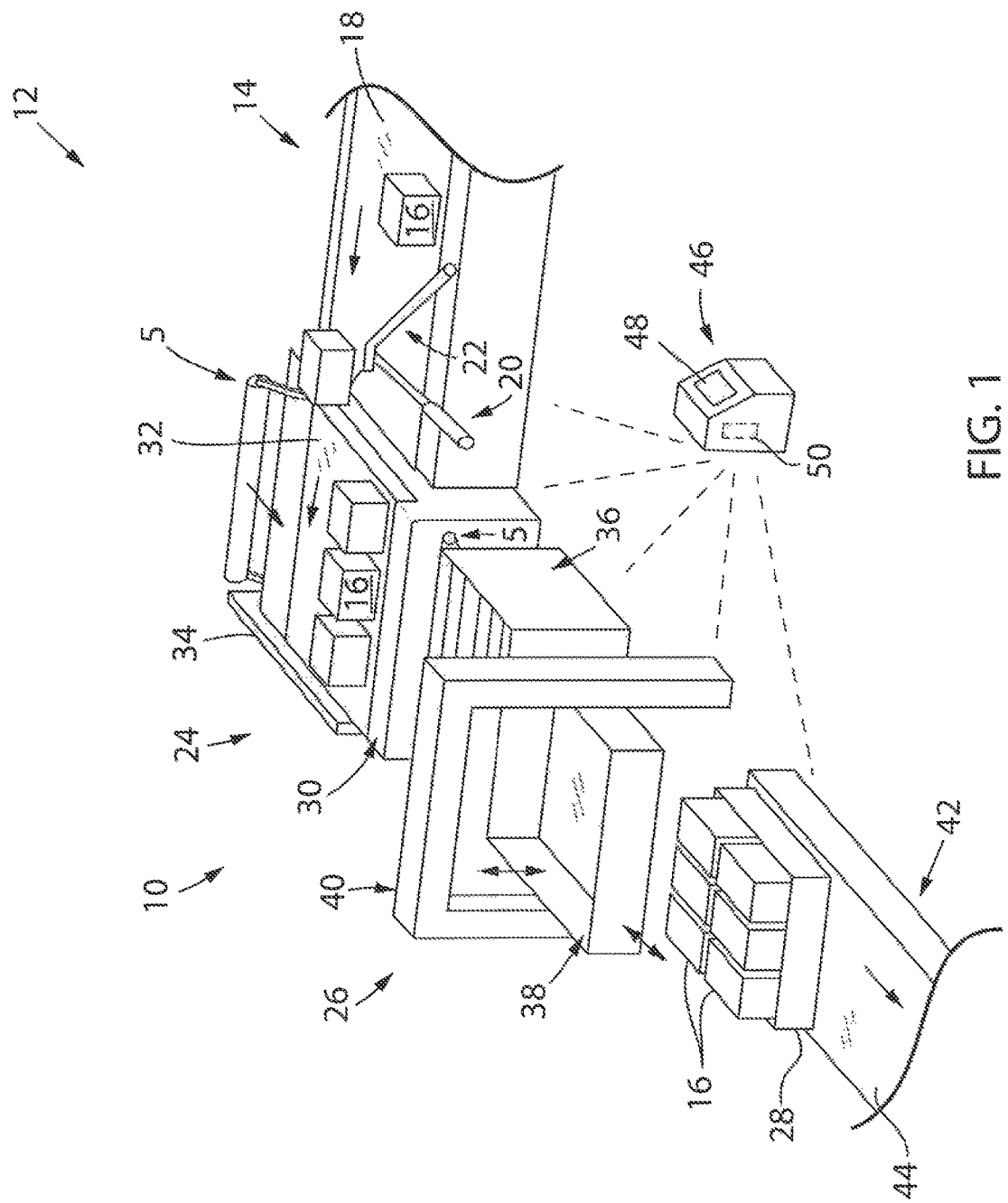
FIG. 1 is a partially schematic pictorial view of a palletizer of the material-handling system incorporating a row sweep system(s) in accordance with the present invention.

Specific embodiments of the present invention will be described by the following non-limiting examples which will serve to illustrate various features of the invention. With reference to the drawing figures in which like reference numerals designate like parts throughout the disclosure, representative embodiments of the present invention are shown as a row sweep system(s) 5 in FIG. 1, shown used with a palletizer 10 represented as a case palletizer in a material-handling system 12. It is understood that row sweep system 5 may be used with other types of palletizers or with different material handling systems.

Still referring to FIG. 1, material-handling system 12 includes a feed conveyor 14 that moves product 16 to the palletizer 10. Feed conveyor 14 includes a conveyor belt 18, which also may be a roller conveyor or any other conveying arrangement, that rotates in the direction of the palletizer 10 and has an outlet end 20 that is shown with a deflector 22 that can be actuated to deflect or reorient product 16 to provide a specific pattern of product received at the palletizer 10.

Still referring to FIG. 1, palletizer 10 includes a row-forming station 24 at which rows of product are formed and a layer-forming station 26 at which the rows of product are stacked as layers onto a pallet 28. Row-forming station 24 includes row-forming table 30 shown with conveyor belt 32 that moves product 16 from the outlet end 20 of feed conveyor 14 toward a wall 34 of the row-forming table 30. Row sweep system 5 is configured to sweep the rows of product 16 off the row-forming station 24 onto the layer-forming station 26.

Still referring to FIG. 1, layer-forming station 26 is shown with an intermediate transfer station 36 that receives the product 16 from the row-forming station 24 and may include the row sweep system 5 to sweep the rows of product 16 into a layer carriage 38 of an elevator 40. Elevator 40 is configured to move the layer carriage 38 up and over the pallet 28 to place a layer of product 16 on the pallet 28 or on another layer of product 16 on the pallet 28. Loaded pallet conveyor 42 includes a conveyor belt 44 that moves the loaded pallets 28 away from the palletizer 10.

Still referring to FIG. 1, a control system 46 controls various components of material-handling system 12. Control system 46 includes a user interface 48 that allows a user to input commands or other information to the control system 46 and monitor system characteristics. User interface 48 is operably coupled to an industrial computer shown as computer 50 or, e.g., a programmable logic controller (PLC), along with corresponding software and suitable hardware that allow a user to input operating parameters through user interface 48, such as speed of various components, pattern(s) product 16 at each layer and arrangement of the stacked layers on pallet 28. Computer 50 includes circuitry with a processor that is configured to execute particular applications that operate in accordance with a computer software program that is stored in memory. Computer 50 receives data and/or signals from various sensors wirelessly or through conductors in the material-handling system 12 for evaluating and executing control decisions while controlling various electronic, pneumatic, and/or hydraulic components such as motors, solenoids, and various actuators for operation of the material handling system 12.

Figure 2:
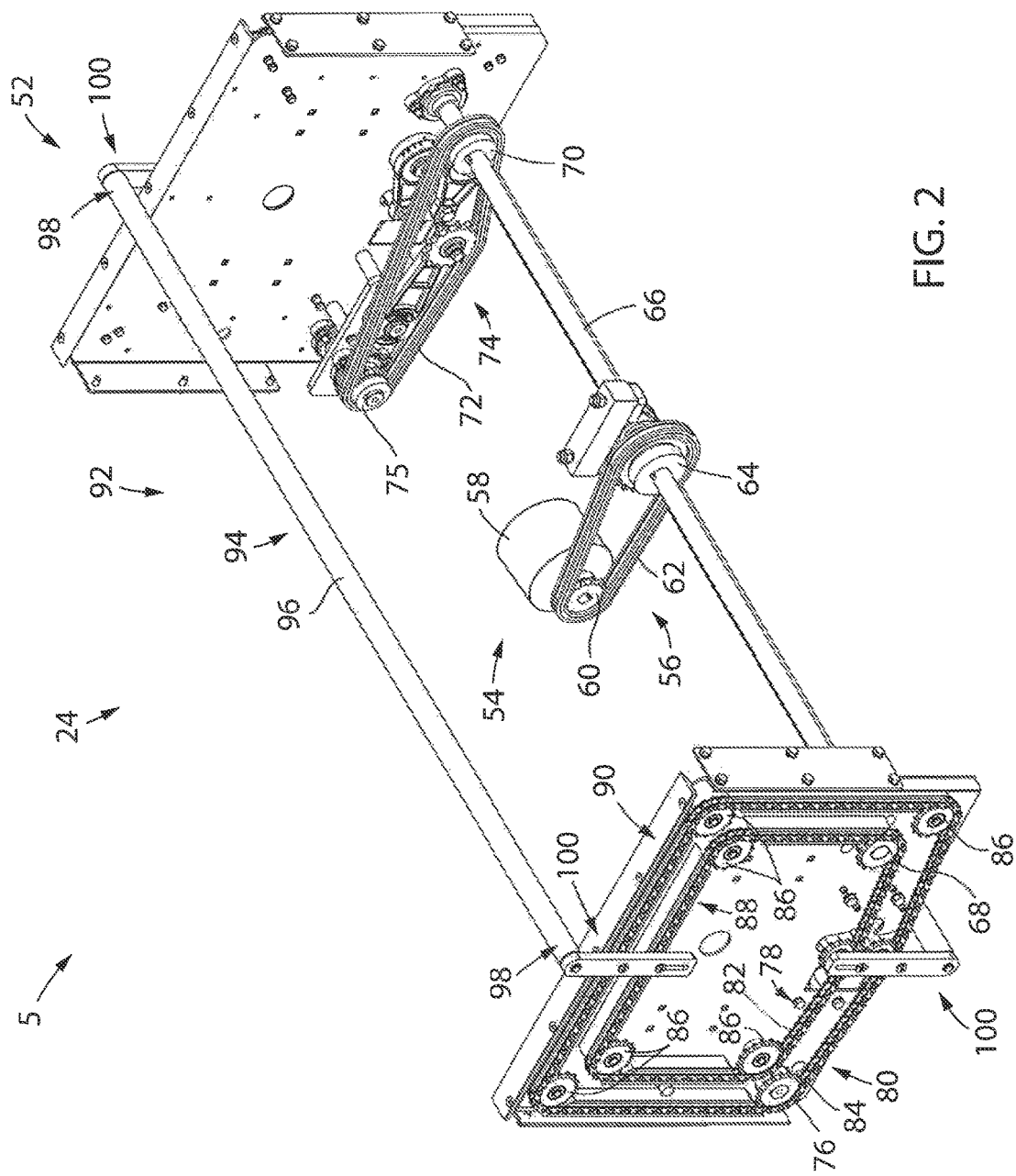
FIG. 2 is a pictorial view of the row sweep system such as of the type illustrated in FIG. 1.

Referring now to FIG. 2, row sweep system 5 includes a sweep arrangement 52 and a sweep drive system 54 that drives the sweep arrangement 52 around a station of the material-handling system 12, such as the row-forming and/or layer-forming station(s) 24, 26 (FIG. 1), at a substantially constant velocity, as explained in greater detail elsewhere herein. Sweep drive system 54 includes a primary drive system 56 with a motor 58 that drives a motor sprocket 60 which rotates a primary drive chain 62 that rotates a shaft sprocket 64 and a primary shaft 66. Each end of primary shaft 66 directly drives an inner loop drive sprocket 68 at a respective side of the row sweep system 5 and has a secondary drive sprocket 70 that rotates a secondary drive chain 72 of a secondary drive system 74. The secondary drive system 74 includes a secondary drive output shaft sprocket 75 that rotates an outer loop drive sprocket 76. Secondary drive output shaft sprocket 75 is sized with respect to the secondary drive sprocket 70 to provide a drive ratio between the inner and outer loop drive sprockets 68, 76 that allows the outer loop drive sprocket 76 to rotate faster than the inner loop drive sprocket 68.

Still referring to FIG. 2, inner and outer loop drive sprockets 68, 76 are configured to rotate a pair of continuous drive members 78, 80 that travel along respective continuous paths that define continuous drive loops as a two-loop design or configuration. Continuous drive members 78, 80 can be first and second drive chains such as roller chains, shown here as inner and outer drive chains 82, 84, but it is understood that the continuous drive members 78, 80 may be belts or other flexible power transmission devices. Inner and outer drive chains 82, 84 are supported for rotation respectively by inner and outer loop drive sprockets 68, 76 and spaced apart idle sprockets 86. Inner drive chain 82 rotates along a path of a drive loop defined by the inner loop drive sprocket 68 and respective idle sprockets 86, shown as an inner drive chain loop 88. An outer drive chain 84 rotates along a path of a drive loop defined by the outer loop drive sprocket 76 and respective idle sprockets 86, shown as an outer drive chain loop 90.

Still referring to FIG. 2, sweep arrangement 52 includes a sweep arm assembly 92 with a sweep pusher arm 94, shown here with a cylindrical roller 96 that can rotate about its longitudinal axis. Roller 96 extends across row sweep system 5, with ends 98 of the roller supported by a pair of sweep link arms 100.

Figure 3:
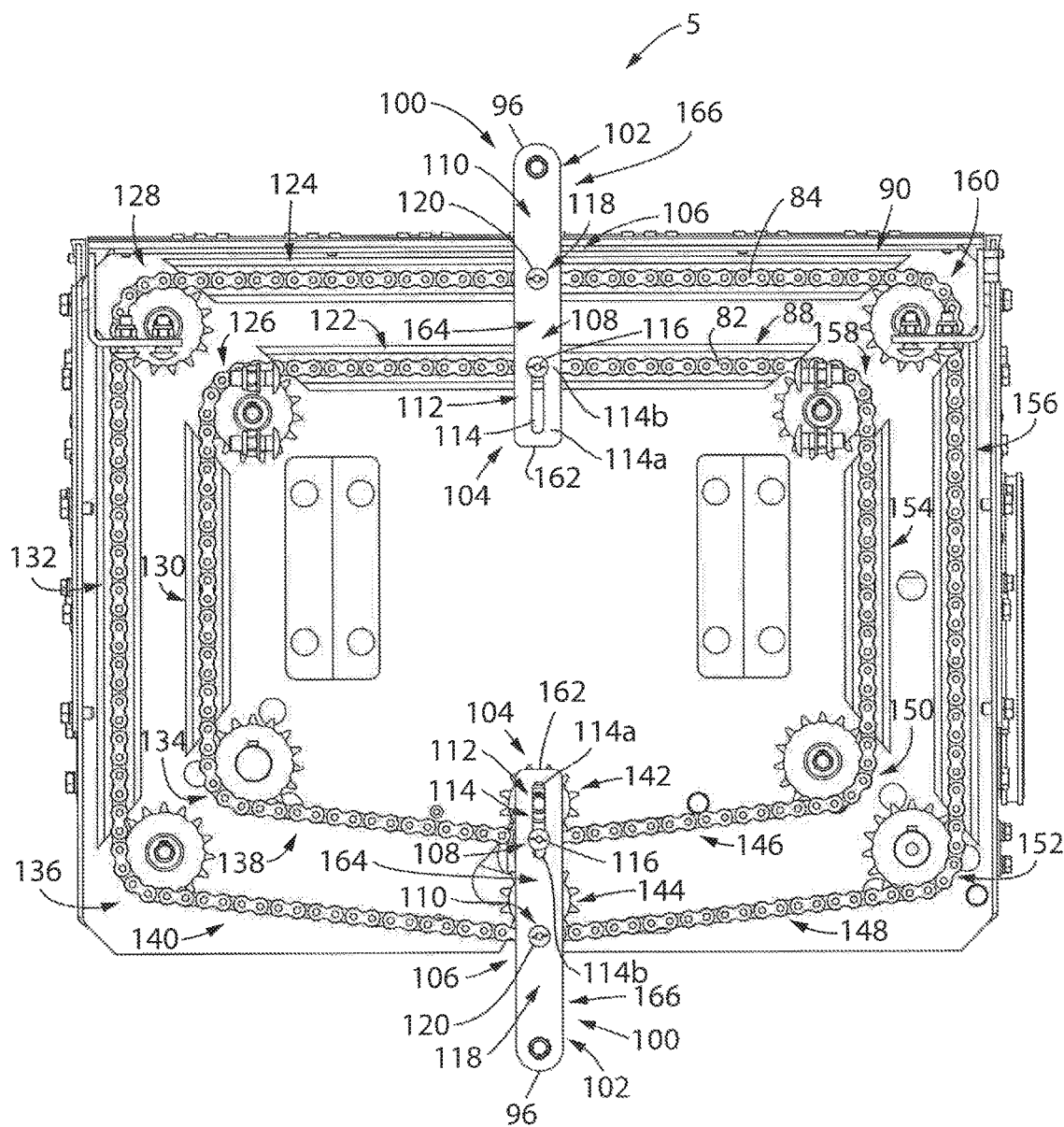
FIG. 3 is a side elevation view of the row sweep system of FIG. 2.

Referring now to FIG. 3, each sweep link arm 100 has an outer link arm segment 102 that supports the respective roller end 98 (FIG. 2), an inner link arm segment 104 arranged toward inner drive chain 82, and an intermediate link arm segment 106 arranged toward the outer drive chain 84. Inner and outer pivot arrangements 108, 110 respectively connect the inner link arm segment 104 to the inner drive chain 82 and the intermediate link arm segment 106 to the outer drive chain 84. Inner pivot arrangement 108 includes a slide pivot 112 defined by a slot 114 that extends longitudinally through the inner link arm segment 104, and a pivot pin 116 that is connected to inner drive chain 82 with a fastener(s) providing an inner driving engagement location at an engagement of the inner drive chain 82 and the inner link arm segment 104. Pivot pin 116 can slide along the length of slot 114 and therefore vary its position along the length of sweep link arm 100 while maintaining a pivot connection between inner link arm segment 104 and inner drive chain 82. Slot 114 has an inner end 114*a* arranged furthest from roller 96 and an outer end 114*b* arranged closest to roller 96. Outer pivot arrangement 118 includes a pivot pin 120 that is connected to outer drive chain 84 with a fastener(s), providing an outer driving engagement location defined at an engagement of the outer drive chain 84 and the intermediate link arm segment 106. Pivot pin 120 remains in a fixed position along the length of sweep link arm 100 while maintaining a pivot connection between intermediate link arm segment 106 and outer drive chain 84.

Still referring to FIG. 3, the position of pivot pin 116 within slot 114 depends on the position of the sweep link arm 100 in its travel around the station 24 (FIGS. 1 and 2) of the material-handling system 12 (FIG. 1). That is because the inner and outer drive chains 82, 84 are spaced at different distances at different locations along different segments of the inner and outer drive chain loops 88, 90. The segments of the inner and outer drive chain loops 88, 90 respectively include upper segments 122, 124 that connect through upper-left corners 126, 128 to left side segments 130, 132. Left side segments 130, 132 connect through lower-left corners 134, 136 to lower left segments 138, 140. Lower left segments 138, 140 connect through rotary tensioners 142, 144 of the inner and outer drive chain loops 88, 90 to lower right segments 146, 148. Lower right segments 146, 148 connect through lower-right corners 150, 152 to right side segments 154, 156. Right side segments 154, 156 connect through upper-right corners 158, 160 to upper segments 122, 124.

Still referring to FIG. 3, the distances between the inner and outer drive chain loops 88, 90 are the smallest and generally constant along straight-line segments of the loops, such as between the inner and outer drive chains 82, 84 within each of the upper segments 122, 124, left side segments 130, 132, lower left segments 138, 140, lower right segments 146, 148, and right side segments 154, 156. A distance between pivot pin 120 of outer pivot arrangement 118 and outer end 114*b* of sweep link arm slot 114 generally corresponds to the distance between the inner and outer drive chain loops 88, 90 at the straight-line segments. Compared to the straight-line segments of the loops, inner and outer drive chains 82, 84 are spaced relatively farther from each other at the rotary tensioners 142, 144. Inner and outer drive chain loops 88, 90 are arranged semi-concentrically with respect to each other so that the inner and outer drive chains 82, 84 are spaced farthest from each other at the upper-left corners 126, 128, lower-left corners 134, 136, lower-right corners 150, 152, and upper-right corners 158, 160. A distance between pivot pin 120 of outer pivot arrangement 118 and inner end 114*a* of sweep link arm slot 114 generally corresponds to the distance between the inner and outer drive chain loops 88, 90 at apexes of the corners.

Still referring to FIG. 3, the space between pivot pins 116, 120 varies based on the position of pivot pin 116 within slot 114, which corresponds to spacing between inner and outer drive chain loops 88, 90 at a particular location and an orientation of the sweep link arm 100 at that particular location. A minimum pin spacing is defined when pivot pin 116 is at the outer end 114*b* of sweep link arm slot 114 and a tip 162 of inner link arm segment 104 is positioned farthest inward and spaced inwardly farthest from inner drive chain loop 88. The minimum pin spacing is shown at the sweep link arm 100 toward the top of FIG. 3. A maximum pin spacing is defined when pivot 116 is at the inner end 114*a* of sweep link arm slot 114 and the tip 162 of inner link arm segment 104 is positioned farthest outward and spaced inwardly closest to the inner drive chain loop 88. The maximum pin spacing is achieved when the roller 96 and sweep link arm 100 are at the apexes of and extend normal to the corners 126, 128, 134, 136, 150, 152, 158, 160.

Still referring to FIG. 3, since the sweep link arm 100 is driven by both the inner and outer drive chain loops 88, 90, a variable length-driven lever arm 164 is defined by a length of the portion of sweep link arm 100 that is between the driving points defined by pivot pins 116, 120 of the inner and outer pivot arrangements 108, 110. Since the distance between pivot pin 120 of the outer pivot arrangement 110 and roller 96 of sweep pusher arm 94 stays constant, a constant length working lever arm 166 is defined by the distance between pivot pin 120 of outer pivot of sweep link arm 100 and roller 96.

Figure 4:
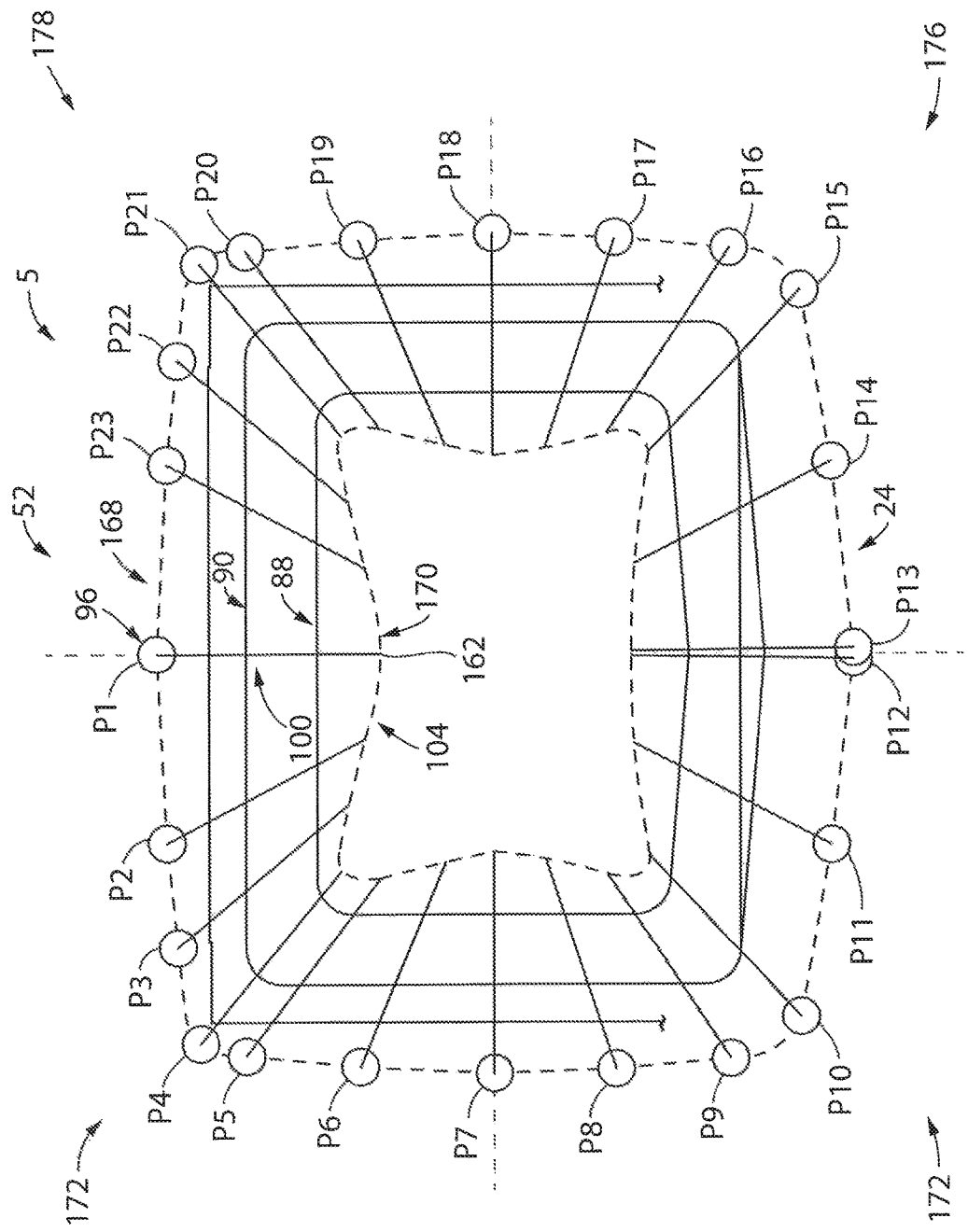
FIG. 4 is a schematic representation of a travel path(s) of various components of the row sweep system of FIG. 2.

Referring now to FIG. 4, a roller path 168 is shown in dashed outline outside of the perimeter of the station, shown here as row-forming station 24. Roller path 168 is the path along which the roller 96 travels around or circumscribes row-forming station 24 during use of row sweep system 5. Roller 96 has the most clearance from row-forming station 24 at half-way points in its travel above, below, and at each side of row-forming station 24 and thus at 12-o'clock, 9-o'clock, 6-o'clock, and 3-o'clock positions, as shown. Roller 96 has the least amount of clearance when passing over the corners of row-forming station 24.

Still referring to FIG. 4, tip path 170 is shown in dashed outline inside of the perimeter of row-forming station 24. Tip path 170 is the path along which the tip 162 of inner link arm segment 104 travels around or circumscribes a central portion of the row-forming station 24 during use of row sweep system 5. Tip 162 of inner link arm segment 104 cyclically moves closer to and farther from inner drive chain loop 88 while traveling around row-forming station 24. Tip 162 of inner link arm segment 104 is farthest from inner drive chain loop 88 when the sweep link arm 100 is at 12-o'clock, 9-o'clock, 6-o'clock, and 3-o'clock positions, as shown relative to the row-forming station 24. Tip 162 of inner link arm segment 104 is closest to inner drive chain loop 88 when the sweep link arm 100 is aligned with apexes of the inner and outer drive chain loop corners 126, 128, 134, 136, 150, 152, 158, 160 (FIG. 3).

Still referring to FIG. 4 and with background reference to FIG. 3, the semi-concentric relationship of inner and outer drive chain loops 88, 90 and the drive speed relationship of inner and outer drive chain loops 88, 90 allow the sweep link arm 100 to cyclically reorient itself relative to its travel direction. As shown, a length of inner drive chain loop 88 is about three-quarters of a length of outer drive chain loop 90 and inner drive chain loop 88 rotates with a velocity of about three-quarters of a velocity of outer drive chain loop 90. This, along with the arrangement of the slide pivot 112 (FIG. 3) at the variable length driven lever arm 164 (FIG. 3) and location-fixed pivot pin 120 (FIG. 3) at the variable length driven lever arm 164 (FIG. 3), allows the sweep link arm 100 to define different orientations such as perpendicular to its travel direction, tilted toward travel direction, or tilted away from the travel direction, repeating such cycle at each quadrant while traveling about the row-forming station 24 (FIGS. 1 and 2).

Still referring to FIG. 4 and with background reference to FIG. 3, an upper left quadrant 172 of travel about row-forming station 24 (FIGS. 1 and 2) is shown here by the sweep link arm 100 traveling counterclockwise from a 12-o'clock position to a 9-o'clock position, represented as advancing sequentially from position P1 to P7. At the beginning of travel through upper left quadrant 172, sweep link arm 100 is at position P1, perpendicular to the travel direction and normal with respect to the inner and outer drive chain loops 88, 90. In position P1, the pivot pin 116 (FIG. 3) is at the outer end 114b (FIG. 3) of sweep link arm slot 114 (FIG. 3) and tip 162 farthest from inner drive chain loop 88. At positions P2 and P3, sweep link arm 100 is tilted forward with respect to the travel direction with roller 96 traveling ahead of tip 162. While sweep link arm 100 tilts farther forward, pivot pin 116 (FIG. 3) slides through sweep link arm slot 114 (FIG. 3), advancing away from outer end 114b (FIG. 3) and toward inner end 114a (FIG. 3). At position P4, sweep link arm 100 is generally aligned with the apexes of, and extends generally normal to, inner and outer drive chain loops 88, 90 at corners 126, 128 (FIG. 3). When at position P4, pivot pin 116 (FIG. 3) is at or near the inner end 114a (FIG. 3) of sweep link arm slot 114 (FIG. 3), and tip 162 is closest to inner drive chain loop 88. At positions P5 and P6, sweep link arm 100 is tilted backward with respect to the travel direction, with roller 96 traveling behind tip 162. While traveling from position P4 through P5 and P6 toward P7, sweep link arm 100 tilts less far back or straightens. As the sweep link arm 100 approaches P7, pivot pin 116 (FIG. 3) slides through sweep link arm slot 114 (FIG. 3), advancing away from inner end 114a (FIG. 3) and toward outer end 114b (FIG. 3). When sweep link arm 100 reaches position P7, it is again perpendicular to the travel direction and normal with respect to the inner and outer drive chain loops 88, 90. In position P7, the pivot pin 116 (FIG. 3) is at the outer end 114b (FIG. 3) of sweep link arm slot 114 (FIG. 3) and tip 162 is farthest from inner drive chain loop 88.

Still referring to FIG. 4 and with background reference to FIG. 3, a lower left quadrant 174 of travel about row-forming station 24 (FIGS. 1 and 2) is shown here by the sweep link arm 100 traveling counterclockwise from a 9-o'clock position to a 6-o'clock position, represented as advancing sequentially from position P7 to P12. At the beginning of travel through lower left quadrant 174, sweep link arm 100 travels from its P7 position perpendicular to the travel direction to tilt forward with respect to the travel direction with roller 96 traveling ahead of tip 162. While sweep link arm 100 tilts farther forward through positions P8 and P9, pivot pin 116 (FIG. 3) slides through sweep link arm slot 114 (FIG. 3), advancing away from outer end 114b (FIG. 3) and toward inner end 114a (FIG. 3). Between positions P9 and P10, sweep link arm 100 is generally aligned with the apexes of, and extends generally normal to, inner and outer drive chain loops 88, 90 at corners 134, 136 (FIG. 3). When between positions P9 and P10, pivot pin 116 (FIG. 3) is at or near the inner end 114a (FIG. 3) of sweep link arm slot 114 (FIG. 3) and tip 162 is in its closest position to the inner drive chain loop 88. As represented at position P10, sweep link arm 100 leaves the corners 134, 136 (FIG. 3) tilted backward with respect to the travel direction, with roller 96 traveling behind tip 162. While traveling from position P10 through P11 toward P12, sweep link arm 100 tilts less far back or straightens. As the sweep link arm 100 approaches a 6-o'clock position just beyond position P12, pivot pin 116 (FIG. 3) slides through sweep link arm slot 114 (FIG. 3), advancing away from inner end 114a (FIG. 3) and toward outer end 114b (FIG. 3).

Still referring to FIG. 4 and with background reference to FIG. 3, a lower right quadrant 176 of travel about row-forming station 24 (FIGS. 1 and 2) is shown here by the sweep link arm 100 traveling counterclockwise from a 6-o'clock position to a 3-o'clock position, represented as advancing sequentially from position P13 to P18. Sweep link arm 100 leaves a 6-o'clock position perpendicular to the travel direction to tilt forward with respect to the travel direction with roller 96 traveling ahead of tip 162, starting at about position P13. While sweep link arm 100 tilts farther forward through positions P14 and P15, pivot pin 116 (FIG. 3) slides through sweep link arm slot 114 (FIG. 3), advancing away from outer end 114b (FIG. 3) and toward inner end 114a (FIG. 3). Between positions P15 and P16, sweep link arm 100 is generally aligned with the apexes of, and extends generally normal to, inner and outer drive chain loops 88, 90. At corners 150, 152 (FIG. 3), pivot pin 116 (FIG. 3) is at or near the inner end 114a (FIG. 3) of sweep link arm slot 114 (FIG. 3), and tip 162 is closest to inner drive chain loop 88. As represented at position P16, sweep link arm 100 leaves the corners 150, 152 (FIG. 3) tilted backward with respect to the travel direction, with roller 96 traveling behind tip 162. While traveling from position P16 through P17 toward P18, sweep link arm 100 tilts less far back or straightens. As the sweep link arm 100 approaches a 3-o'clock position at position P18, pivot pin 116 (FIG. 3) slides through sweep link arm slot 114 (FIG. 3), advancing away from inner end 114a (FIG. 3) and toward outer end 114b (FIG. 3) and tip 162 is farthest from the inner drive chain loop 88.

Still referring to FIG. 4 and with background reference to FIG. 3, an upper right quadrant 178 of travel about row-forming station 24 (FIGS. 1 and 2) is shown here by the sweep link arm 100 traveling counterclockwise from the 3-o'clock position to the 12-o'clock position, represented as advancing sequentially from position P18 to P1. Sweep link arm 100 travels from its P18 position perpendicular to the travel direction to tilt forward with respect to the travel direction with roller 96 traveling ahead of tip 162. While sweep link arm 100 tilts farther forward through positions P19 and P20, pivot pin 116 (FIG. 3) slides through sweep link arm slot 114 (FIG. 3), advancing away from outer end 114b (FIG. 3) and toward inner end 114a (FIG. 3). At position P21, sweep link arm 100 is generally aligned with the apexes of, and extends generally normal to, inner and outer drive chain loops 88, 90. At corners 158, 160 (FIG. 3), pivot pin 116 (FIG. 3) is at or near the inner end 114a (FIG. 3) of sweep link arm slot 114 (FIG. 3) and tip 162 is in its closest position to the inner drive chain loop 88. At positions P22 and P23, sweep link arm 100 is tilted backward with respect to the travel direction, with roller 96 traveling behind tip 162. While traveling from position P21 through P22 and P23 toward P1, sweep link arm 100 tilts less far back or straightens until it again achieves the position perpendicular to the travel direction and normal with respect to the inner and outer drive chain loops 88, 90 at P1.

Still referring to FIG. 4, the travel of the sweep arrangement 52 with the roller 96 traveling along roller path 168 and the tip 162 of inner link arm segment 104 traveling along tip path 170 allow an outer end of sweep link arm 100 and roller 96 to maintain a substantially constant velocity while traveling around the station 24 (FIGS. 1 and 2). While the above description assumes movement about of sweep arrangement 52 about station 24 (FIGS. 1 and 2) in a counterclockwise direction, it is understood that this description applies equally but in reverse order for movement of sweep arrangement 52 about station 24 (FIGS. 1 and 2) in a clockwise direction.

Figure 5:
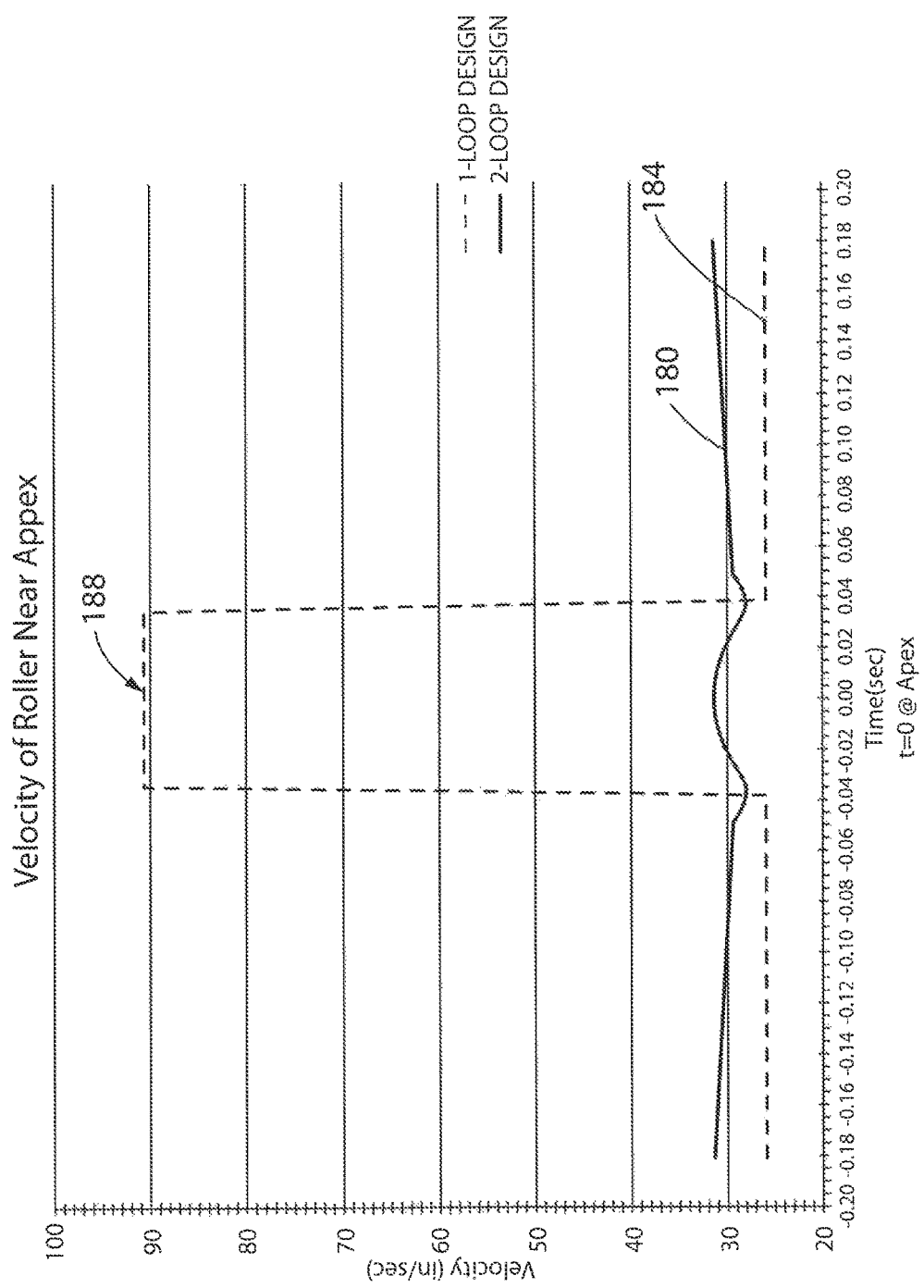
FIG. 5 is a plot showing roller velocity as a function of time of rollers of sweep systems of one-loop and two-loop designs near an apex of a corner.
Figure 6:
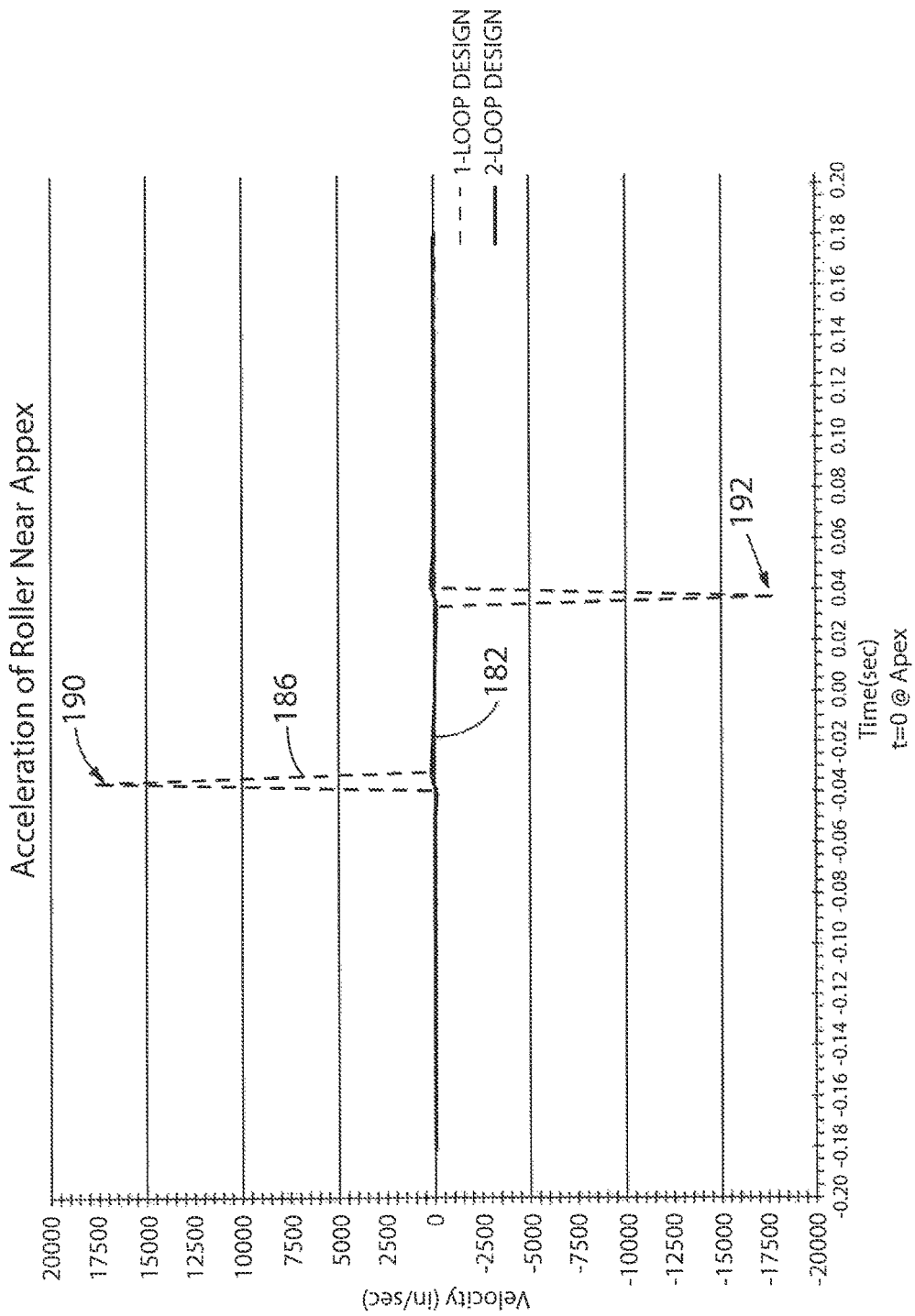
FIG. 6 is a plot showing roller acceleration as a function of time of rollers of sweep systems of one-loop and two-loop designs near an apex of a corner.

Referring now to FIGS. 5 and 6, these plots show the substantially constant velocity and substantially low acceleration values of roller 96 while traveling through corners with the row sweep system 5 of a two-loop design configured as the inner and outer drive chain loops 88, 90 compared to a one-loop design in which a single chain drives a sweep pusher arm. The plots represent data from motion analyses of a two-loop design shown in solid lines as two-loop lines 180 (FIG. 5) and 182 (FIG. 6). A one-loop design is shown in dashed lines as one-loop lines 184 (FIG. 5) and 186 (FIG. 6). In making the evaluations, the one-loop design was configured with the same length working lever arm as that of working arm 166 of the two-loop design shown in FIG. 3, but cantilevered outwardly from the single drive chain. In such one-loop design, a fulcrum is defined by a geometric center point of the roller chain link that supports the working lever arm, whereby an opposing lever arm is equal to one-half the length of one roller chain link, which was approximately 0.25 inch, as evaluated. By comparison, in the two-loop design (FIG. 3), the fulcrum is the attachment point on the outer loop or pivot pin 120 that connects sweep link arm 100 to outer drive chain loop 90. The opposing lever arm of the two-loop design is the distance between the attachment points of the inner and outer loops or between pivot pins 116, 120 that connect sweep link arm 100 to inner and outer drive chain loops 88, 90. This length was approximately 2.5 inches, as evaluated, or about ten times the opposing lever arm of the evaluated one-loop design.

Still referring to FIGS. 5 and 6, compared to the two-loop design, the evaluated one-loop design experienced substantial unwanted forces due to inertia, realized as unwanted momentum as the roller changed direction(s) through a corner. The data represented in the plots shows characteristics immediately before and after the apexes of the corners at a constant drive motor output speed of 206 RPM (rotations per minute), with apex(es) shown as time=0.

Referring now to FIG. 5, one-loop line 184 shows that roller 96 of the one-loop design experienced substantial near step-change type changes in velocity at the corner(s), about 0.04 second before reaching the corner apex and about 0.04 second after reaching the corner apex. In the one-loop design, the velocity of roller 96 increases from about 26 inches/second to about 91 inches/second about 0.04 second before reaching the corner apex. Then, about 0.04 second after reaching the corner apex, the velocity of roller 96 decreases from about 91 inches/second back to about 26 inches/second. This is represented as a velocity-increased stage 188 of one-loop line 184. In contrast, the two-loop line 180 shows that roller 96 of the two-loop design maintains a velocity of about 30 inches/second through the corner, varying between about 28 and 32 inches/second during a time period from about 0.04 second before reaching the corner apex to about 0.04 second after reaching the corner apex.

Referring now to FIG. 6, one-loop line 186 shows that roller 96 of the one-loop design experienced substantial increases in acceleration, shown as acceleration spikes 190, 192. At about 0.04 second before reaching the corner apex, roller 96 of the one-loop design experienced an acceleration of about 18,000 inches/second/second as shown at acceleration spike 190. At about 0.04 second after reaching the corner apex, roller 96 of the one-loop design experienced a deceleration of about 18,000 inches/second/second as shown at acceleration spike 192, with its negative value. In contrast, the two-loop line 182 shows that roller 96 of the two-loop design experiences nominal acceleration through the corner(s).

In view of the above, it can be appreciated that the row sweep system 5 is configured to allow roller 96 travel around the station at a substantially constant velocity even through or while rounding corners by allowing the roller 96 to travel distances that are substantially equal to each other per equal time intervals while passing through apexes of the corners.

Various alternatives and embodiments are contemplated as being within the scope of the following claims particularly pointing out and distinctly claiming the subject matter regarded as the invention.

I claim:

1. A row sweep system for a palletizer of a material-handling system, wherein the palletizer includes a station across which product is moved for palletizing, the row sweep system comprising:
    a sweep arrangement that is configured to travel around the station for pushing product off from the station;
    a sweep drive system configured to drive the sweep arrangement around the station, the sweep drive system including:
        a first continuous drive member traveling along a continuous path that defines a first drive loop;
        a second continuous drive member traveling along a continuous path that defines a second drive loop that is arranged outwardly of the first drive loop; and
        wherein each of the first and second continuous drive members is connected to the sweep arrangement so that a first segment of the sweep arrangement travels along a path corresponding to the first drive loop, and a second segment of the sweep arrangement travels along a path corresponding to the second drive loop.

2. The row sweep of claim 1, wherein each of the first and second continuous drive members is a drive chain.

3. The row sweep system of claim 1, wherein the at least one station includes a row-forming station and a layer-forming station, and wherein the sweep arrangement is configured to push product from the row-forming station to the layer-forming station.

4. The row sweep system of claim 1, wherein the sweep arrangement comprises a pair of sweep link arms with a sweep pusher arm extending between the pair of sweep link arms for pushing product off from the station, and wherein the pair of sweep link arms is configured to drive the sweep pusher arm at a substantially constant velocity while traveling around the station.

5. The row sweep system of claim 1, wherein the first continuous drive member is defined by an inner drive chain defining an inner drive chain loop, and the second drive member is defined by an outer drive chain arranged outwardly of the inner drive chain and defines an outer drive chain loop.

6. The row sweep system of claim 5, wherein the sweep arrangement includes a sweep arm assembly with a sweep link arm supported by each of the inner and outer drive chains by way of respective inner and outer pivot arrangements.

7. The row sweep system of claim 6, wherein the outer pivot arrangement includes a first pivot pin that is fixed relative to a length of the sweep link arm, and the inner pivot arrangement includes a second pivot pin that is movable relative to the length of the sweep link arm.

8. The row sweep system of claim 7, wherein the sweep link arm has an inner link arm segment and includes a slot that extends longitudinally through the inner link arm segment, and wherein the second pivot pin of the inner pivot arrangement is arranged in the slot and configured to move along the length of the slot.

9. The row sweep system of claim 8, wherein the sweep arm assembly includes a sweep pusher arm supported by the sweep link arm, and wherein the pivot pin of the outer pivot arrangement is arranged between the sweep pusher arm and the slot of the inner link arm segment.

10. A row sweep system for a palletizer of a material-handling system, wherein the palletizer includes a station across which product is moved for palletizing, the row sweep system comprising:
a sweep drive system including:
an inner drive chain configured to rotate through a continuous path that defines an inner drive chain loop;
an outer drive chain configured to rotate through a continuous path that defines an outer drive chain loop arranged outwardly of the inner drive chain loop;
a sweep arrangement driven by the sweep drive system and configured to travel around the station for pushing product off from the station, the sweep arrangement including:
a sweep pusher arm configured to push product off from the station;
a sweep link arm connecting the sweep arm to the sweep drive system, the sweep link arm having:
an inner segment driven by the inner drive chain;
an intermediate segment driven by the outer drive chain; and
an outer segment that extends beyond the station and supports the sweep pusher arm.

11. The row sweep of claim 10, wherein an outer driving engagement location is defined at an engagement between the intermediate segment of the sweep link arm and the outer drive chain and an inner driving engagement location is defined at an engagement between the inner segment of the sweep link arm and the inner drive chain; and wherein the sweep link arm includes:
a working lever arm with a constant length defined between the sweep pusher arm and the outer driving engagement location; and
a driven lever arm with a variable effective length defined between the outer driving engagement location and the inner driving engagement location.

12. The row sweep of claim 11, wherein the inner segment of the sweep link arm includes a slot and the pivot pin is arranged in the slot to move along a length of the slot for attaching the inner segment of the sweep link arm to the inner drive chain and provide the variable effective length of the driven lever arm.

13. The row sweep of claim 12, wherein while the sweep pusher arm travels around the station, an orientation of the sweep link arm varies with respect to a travel direction of the sweep link arm corresponding to movement of the pivot pin along the length of the slot of the inner segment of the sweep link arm for maintaining the substantially constant velocity of the sweep pusher arm while traveling around the station.

14. The row sweep of claim 13, wherein a clearance distance is defined between the sweep pusher arm and the station while traveling along a path around the station, and wherein the clearance distance has a minimum value when the sweep pusher arm travels through a corner of the path.

* * * * *